United States Patent

Lee et al.

[11] 4,019,442
[45] Apr. 26, 1977

[54] BULKHEAD ASSEMBLY AND COUNTERBALANCE MECHANISM THEREFOR

[75] Inventors: Earnest M. Lee, Shawnee Mission, Kans.; Grady L. Clyma, Kansas City, Mo.

[73] Assignee: Roll-O-Matic Chain Company, Kansas City, Mo.

[22] Filed: Mar. 6, 1975

[21] Appl. No.: 555,985

[52] U.S. Cl. .................... 105/376; 16/1 C; 49/200; 160/191; 242/107; 280/179 R; 296/24 R

[51] Int. Cl.[2] .......................................... B60P 7/14

[58] Field of Search .......... 105/376, 283, 486, 489, 105/492–495, 502; 280/179 R; 296/24 R, 50, 56, 24 B, 57 A; 160/189, 190, 193, 191; 16/DIG. 1, 31, 198, 1 C; 49/200, 197, 198; 242/107 R

[56] References Cited

UNITED STATES PATENTS

| | | | |
|---|---|---|---|
| 1,187,898 | 6/1916 | Gallup | 105/493 X |
| 1,224,130 | 5/1917 | Bohn | 105/376 |
| 1,970,610 | 8/1934 | McMullen et al. | 296/24 R |
| 1,994,142 | 3/1935 | Madsen | 160/190 |
| 2,020,831 | 11/1935 | Greegor | 160/189 X |
| 2,142,161 | 1/1939 | Venditty | 16/1 C X |
| 2,684,846 | 7/1954 | Beall | 160/193 |
| 3,017,842 | 1/1962 | Nampa | 160/190 X |
| 3,164,395 | 1/1965 | Burch et al. | 105/376 X |
| 3,412,423 | 11/1969 | Binns | 49/200 X |
| 3,625,544 | 12/1971 | Godwin et al. | 105/376 X |

*Primary Examiner*—Robert J. Spar
*Assistant Examiner*—Winston H. Douglas
*Attorney, Agent, or Firm*—Lowe, Kokjer, Kircher, Wharton & Bowman

[57] ABSTRACT

A movable bulkhead for partitioning a truck body or the like is pivotally supported on an overhead shaft. The shaft extends transversely between a pair of trolleys which ride along tracks and are capable of differential movement thereon. A second pair of trolleys are also track mounted to support a spring-loaded counterbalance mechanism for the bulkhead. Drum and cable assemblies included in the counterbalance mechanism automatically pivot the bulkhead to a raised position when the seal of the bulkhead against the flow of the truck is broken.

8 Claims, 5 Drawing Figures

U.S. Patent  April 26, 1977  Sheet 1 of 2  4,019,442
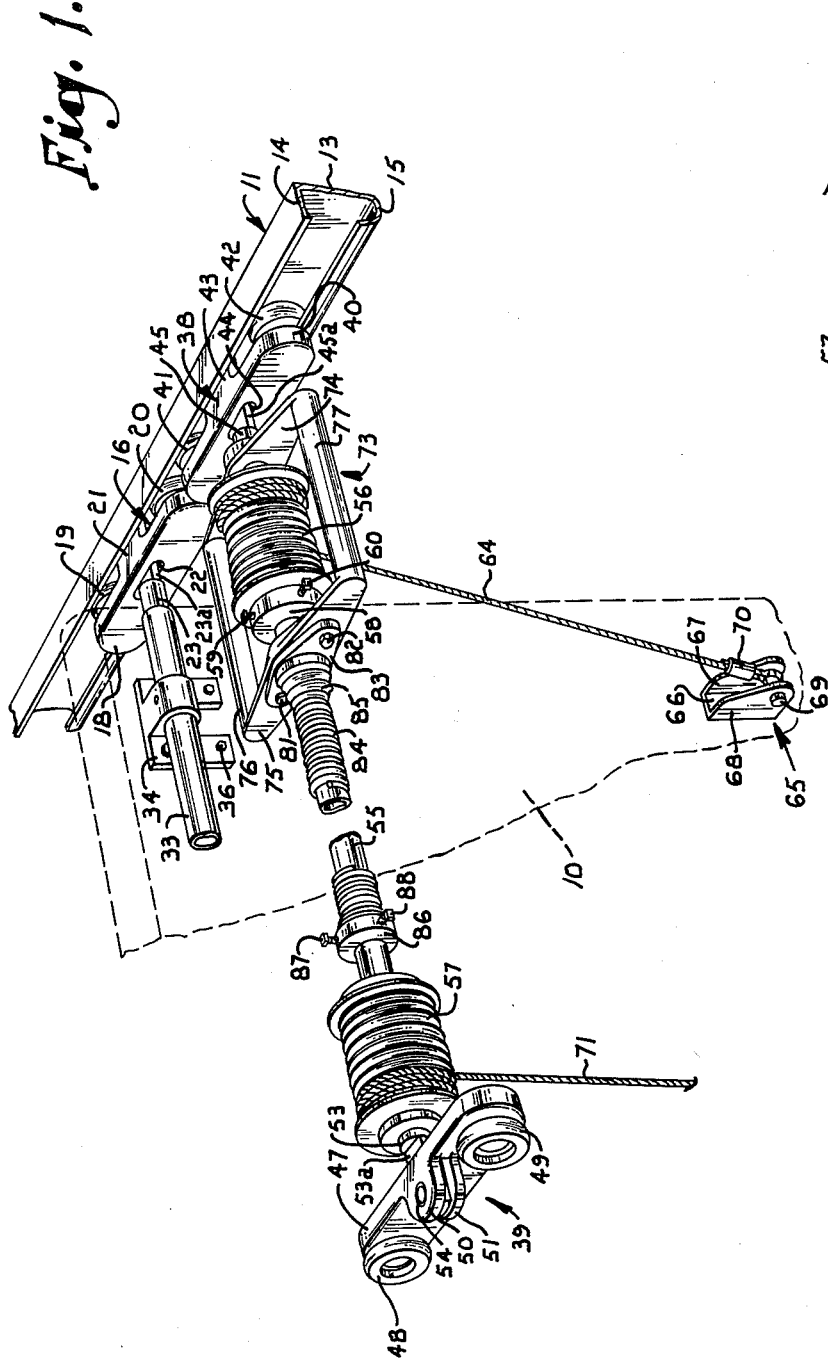
Fig. 1.
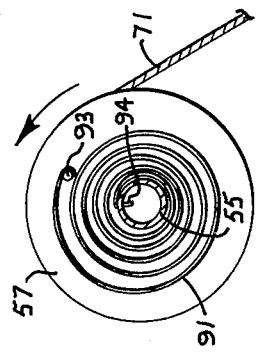
Fig. 3.
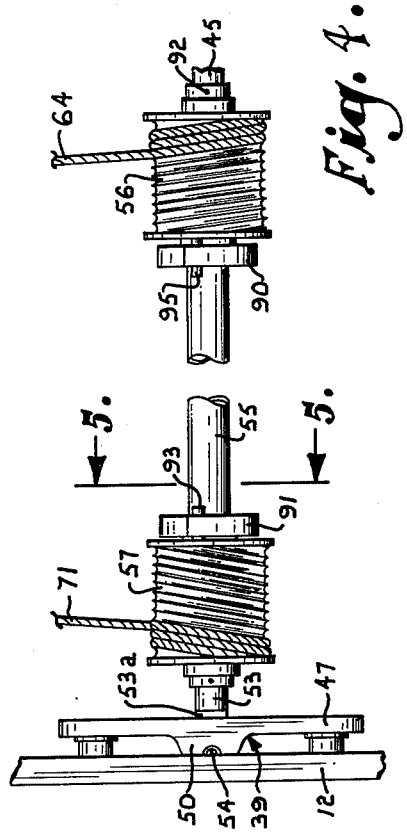
Fig. 4.
Fig. 5.

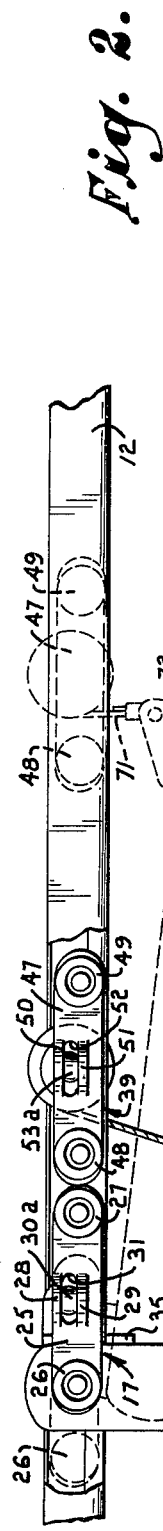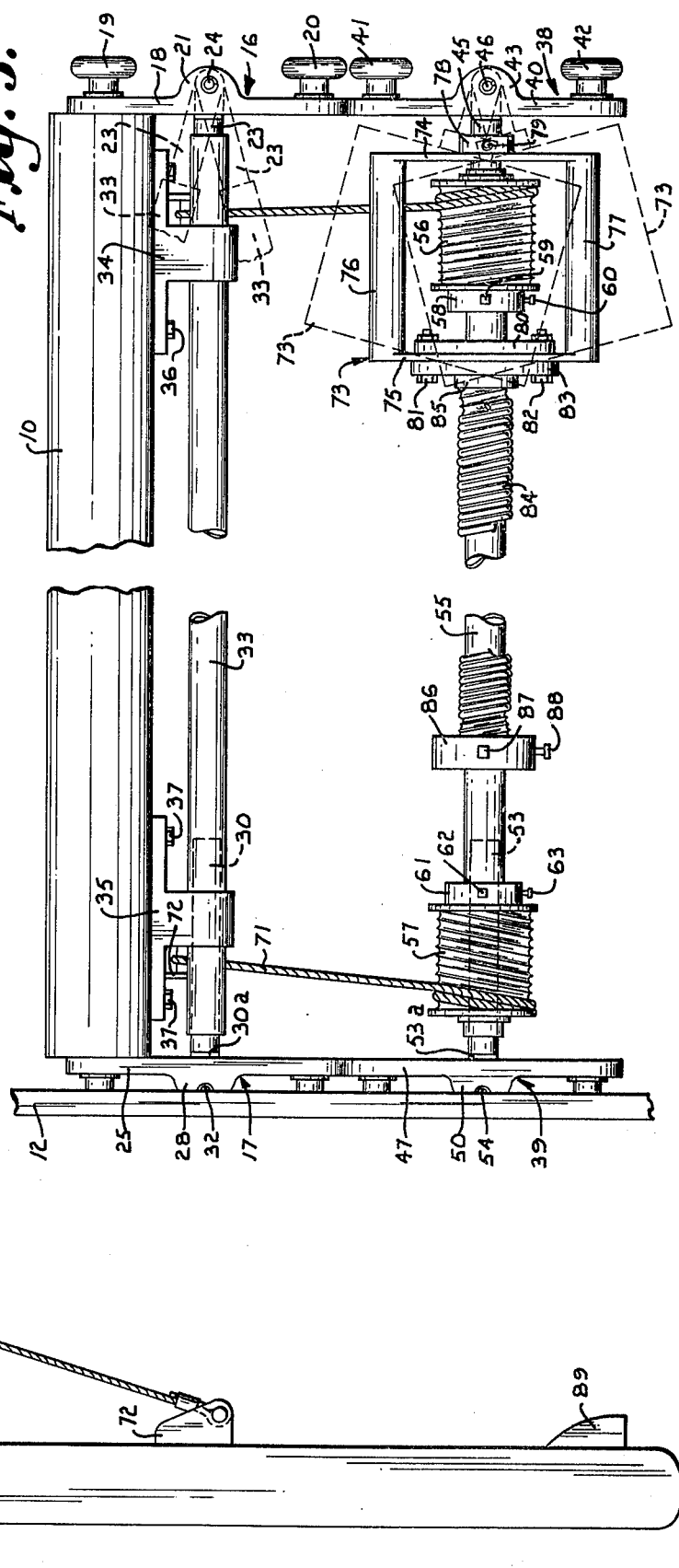

BULKHEAD ASSEMBLY AND COUNTERBALANCE MECHANISM THEREFOR

BACKGROUND AND SUMMARY OF THE INVENTION

In the trucking industry, insulated bulkheads are commonly used to partition trucks into separate compartments which are maintained at different temperatures. The present invention relates to an improved bulkhead assembly and is particularly characterized by the provision of a counterbalance mechanism which facilitates the manipulation of the bulkhead.

In the past, the manipulation of bulkheads has involved considerable difficulty, particularly when the truck is to be loaded or unloaded. The usual practice is to manually move the bulkhead to an appropriate position so that it does not block access to the interior of the truck during loading and unloading. In view of the bulkhead's large size and its awkward configuration, the physical effort required to handle the bulkhead in this manner can be readily appreciated. Also, since the bulkhead must fit tightly against the truck walls, considerable interference is presented when the bulkhead is being longitudinally repositioned within the truck in order to vary the size of the compartments. Finally, total manual handling of the bulkhead may be further undesirable because the vigorous effort sometimes needed to finally locate same may result in damage to either the cargo or the bulkhead, or both.

In view of the foregoing, it is a primary goal of the present invention to provide an improved bulkhead assembly in which ease of bulkhead manipulation is greatly facilitated over known prior art assemblies.

A more specific object of the invention is to provide a unique bulkhead assembly that includes a pivotally mounted bulkhead for partitioning a carrier vehicle and a counterbalance mechanism for pivoting the bulkhead upwardly to permit loading and unloading of the vehicle. It is an important feature of the invention that the bulkhead is raised without requiring substantial manual effort and that it is firmly retained in its raised position for as long as desired.

Another object of the invention is to provide an improved bulkhead assembly that does not interfere with the cargo-carrying capacity of the vehicle and which is easily moved in a longitudinal fashion within the vehicle.

In conjunction with the preceding object, it is a further aim of the invention to provide a bulkhead assembly in which the bulkhead may be quickly and easily moved to any desired longitudinal position. This important feature is achieved by the provision of trolleys which are uniquely adapted to move differentially in order to break the seal of the bulkhead against the vehicle walls, thereby facilitating the relocation of the bulkhead.

An additional object of the invention is to provide a bulkhead assembly that is easily installed and in which the counterbalance mechanism may be incorporated into existing bulkhead installations.

Still another object of the invention is to provide a uniquely constructed bulkhead assembly of the character described which is rugged yet economical and which is easily accessible for inspection and maintenance.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals are employed to indicate like parts in the various views:

FIG. 1 is a fragmentary perspective view of a bulkhead assembly and counterbalance mechanism constructed according to a preferred embodiment of the invention and with portions broken away to more clearly illustrate certain structural details and the broken lines showing the bulkhead in its upright position;

FIG. 2 is a side elevational view of the bulkhead assembly shown in FIG. 1, with portions of the track broken away and the broken line view showing the bulkhead in its raised position;

FIG. 3 is a top plan view of the bulkhead assembly shown in FIG. 1, with the broken-away portions indicating continuous length and the broken lines illustrating the pivotal movement permitted the bar members of the trolleys;

FIG. 4 is a fragmentary top plan view illustrating an alternative means for mounting and rotatively biasing the winding drums on their supporting shaft; and FIG. 5 is a cross sectional view taken generally along the line 5—5 of FIG. 4 in the direction of the arrows.

Referring now to the drawings in detail and initially to FIGS. 1–3, an insulating type bulkhead is designated by reference numeral 10. Bulkhead 10 is used to partition a carrier vehicle such as a truck (not shown) and is of a size to tightly seal against the floor, side walls, and ceiling of a truck body when in an upright position. The bulkhead includes the usual border which is formed of a substance adapted to effect an insulated seal. A pair of identical tracks 11 and 12 are mounted longitudinally on the opposite sidewalls of the truck slightly below the ceiling thereof. With particular reference to FIG. 1, track 11 is of generally channel shaped cross section and includes a flat vertical web 13 which may be secured to the side walls by any suitable means. A flat horizontal flange 14 extends inwardly from the top edge of the web 13, while a lower flane 15 curves inwardly and upwardly from the bottom edge of the web.

A pair of roller assemblies or trolleys 16 and 17 (FIG. 3) ride on the curved lower flanges of the respective tracks 11 and 12 to permit bulkhead 10 to be moved longitudinally within the truck body. Trolley 16 includes a body member 18 having flat opposite sides and rounded ends. Member 18 carries a pair of horizontally spaced wheels 19 and 20 which roll along the track 11. A pair of spaced apart rounded lugs 21 extend outwardly from a central location on the upper and lower edges, respectively, of body member 18. A horizontal slot 22 is formed through body member 18 at a location between the upper and lower lugs. Cylindrical bar 23 is provided on one end with a flat head 23a, same being insertable through slot 22 and pinned between the two lugs by a vertical pivot pin 24 (FIG. 3). Head 23a is sized smaller than the length of slot 22 so that bar 23 is permitted to pivot about the vertical axis of the pin 24. However, the cylindrical portion of bar 23 is considerably larger than slot 22 and engages member 18 to limit the arcuate pivotal movement of the bar in either direction (see the broken line views of FIG. 3).

With particular reference now to FIG. 2, the opposite trolley 17 is constructed identically to trolley 16. A body member 25 carries a pair of spaced wheels 26 and 27 that roll along track 12. A pair of rounded lugs 28 and 29 extend outwardly from member 25 at vertically spaced positions. A cylindrical bar 30 having flat head 30a is inserted through a horizontal slot 31 formed in body member 25 at a location between lugs 28 and 29. Pivot pin 32 (FIG. 3) pins head 30a between lugs 28 and 29 to permit limited arcuate pivotal movement of bar 30 about the vertical axis of the pivot pin. The pivotal movement of bar 30 is likewise limited in either direction by engagement with the portion of body member 25 adjacent slot 31.

A tubular shaft 33 having a length slightly less than the distance between trolleys 16 and 17 is supported at its opposite ends on bars 23 and 30. The cylindrical portions of bars 23 and 30 are slidably inserted in the opposite hollow ends of shaft 33 and are of a length to extend a considerable distance into the shaft, as shown in FIG. 3. Shaft 33 in turn supports bulkhead 10 for pivotal movement between the upright solid line position of FIG. 2 and the raised position shown in broken lines in FIG. 2. Referring to FIG. 3 in particular, a pair of brackets 34 and 35 are secured to one side of bulkhead 10 by respective sets of screws 36 and 37. Brackets 34 and 35 are located slightly inwardly of the opposite lateral edges of the bulkhead and are adjacent the top thereof. Each bracket 34 and 35 includes an outwardly projecting sleeve portion having a cylindrical bore in which shaft 33 is received, thereby supporting the bulkhead for pivotal movement about the horizontal axis of the shaft, as well as for longitudinal movement within the truck body. In addition, the sliding or telescopic fit of bars 23 and 30 in shaft 33 permits differential movement of trolleys 16 and 17 such that one trolley is able to move ahead of the other. However, the limited pivotal movement permitted bars 23 and 30 prevents either bar from pivoting far enough to slip out the end of shaft 33. It is further pointed out that trolleys 16 and 17 are constructed without parts which project inwardly from body members 18 and 25 and that bulkhead 10 is therefore able to contact the flat inward surfaces presented by the body members, as shown in FIG. 3.

A counterbalance mechanism for raising bulkhead 10 is supported for longitudinal movement within the truck body on a second pair of trolleys 38 and 39 which ride along the opposite tracks 11 and 12. Trolleys 38 and 39 are constructed similarly to the previously described trolleys 16 and 17. For example, trolley 38 includes a body member 40 which rotatably carried a pair of spaced wheels 41 and 42. An upper lug 43 extends outwardly from the top edge (as mounted on the track structure) of member 40 and is spaced above an identically shaped lug (not shown). A horizontal slot 44 (FIG. 1) is formed through body member 40 to receive the flat head 45a of a cylindrical bar 45. Head 45a is pinned between the two lugs by a vertical pivot pin 46 (FIG. 3) which permits limited pivotal movement of bar 45 in the manner previously described.

In a similar manner, the body member 47 of trolley 39 rotatably carries a pair of wheels 48 and 49 that roll along track 12. A pair of spaced lugs 50 and 51 extend outwardly from body member 47, while a slot 52 (FIG. 2) extends through the body member to receive a flat head 53a formed on the end of a cylindrical bar 53. Head 53a is pinned at 54 between lugs 50 and 51 to support bar 53 for limited pivotal movement in the manner described above.

A tubular shaft 55 extends horizontally between trolleys 38 and 39 and is supported for rotation on bars 45 and 53. Bar 45 is inserted in one end of shaft 55, while bar 53 is slidably received in the opposite end of shaft 55. The sliding fit of bar 53 in shaft 55 permits differential movement of trolleys 38 and 39 along tracks 11 and 12, although the limited pivotal movement allowed bar 55 prevents same from sliding out of the end of shaft 55 as suggested above.

A pair of cylindrical winding drums 56 and 57 are mounted on shaft 55 near the opposite ends thereof. Drum 56 includes circular discs at its opposite ends and a collar 58 which extends from one of the discs. Collar 58 is provided with threaded openings in which a pair of set screws 59 and 60 are received and tightened against shaft 55 to lock drum 56 on the shaft. Drum 57 is constructed identically and includes large circular discs at its opposite ends with collar 61 (provided with threaded openings) being connected to one of the discs. A pair of set screws 62 and 63 are threaded into the collar openings and tightened against shaft 55 to lock drum 57 onto the shaft.

Drum 56 receives a flexible cable 64 which is secured to the drum at one end. The opposite end of cable 64 is fixed to a bracket 65 which is mounted near one edge of bulkhead 10 and below the center of same. With reference to FIG. 1, bracket 65 includes a flat back piece 66 which is attached to bulkhead 10 and a pair of opposite side plates 67 and 68 that extend outwardly from back piece 66 and are parallel to one another. A pin 69 is secured in aligned holes formed through side plates 67 and 68. The end of cable 64 is drawn around pin 69 and fastened in a loop by a small fastening sleeve 70.

A second flexible cable 71 is wound on drum 57 in a similar manner and is connected at its end to a bracket 72 which is constructed identically to bracket 65 and is located near the edge of bulkhead 10 opposite from bracket 65. Brackets 65 and 72 are mounted at the same elevation on bulkhead 10 and below the center thereof. In this regard, it is preferred that the location of the brackets be approximately six inches below the center of bulkhead 10. This is due to having learned that the pivoting of the bulkhead is most readily accomplished with the brackets located at this position. It is further noted that drums 56 and 57 are located near the opposite side walls of the truck so as not to interfere with the cargo carrying capacity thereof.

Drum 56 is located within a bracket 73 which includes spaced end plates 74 and 75. End plates 74 and 75 are parallel to one another and are interconnected by a pair of parallel side bars 76 and 77. A central opening is formed through end plate 74 to receive bar 45, which also extends through a collar 78 that is connected to end plate 74. Pin 79 is inserted through collar 78 and bar 45 to secure bracket 73 to bar 45. The opposite end plate 75 has a central opening through which shaft 55 extends. Bearing 80 (FIG. 3) which rotatably supports shaft 55 is secured against one side of end plate 75 by a pair of screws 81 and 82 which also mount a support plate 83 to the opposite side of end plate 75.

A torsion spring 84 is coiled around a central portion of shaft 55 in a manner to exert a continuous rotative force on the shaft. One end of spring 84 is connected to a stationary flange 85 that projects from support plate 83, while the opposite end of the spring is connected to a ring member 86 that is rigidly mounted on shaft 55 to rotate therewith. Ring member 86 receives a pair of set screws 87 and 88 that are tightened against shaft 55 to lock the ring member to the shaft. The force exerted by spring 84 tends to rotate shaft 55 in a direction such that drums 56 and 57 wind up the respective cables 64 and 71. The force exerted by spring 84 may be varied as desired by simply loosening set screws 87 and 88 and rotating ring member 86 appropriately before retightening the set screws.

In use, the bulkhead is installed within the interior of a truck or other carrier vehicle. Bulkhead 10 is positioned at a desired location longitudinally in the vehicle and is oriented in the upright position shown in solid lines in FIG. 2. In this position, the insulated bulkhead tightly seals against the floor, side walls, and ceiling of the vehicle to partition same into sealed compartments. Cables 64 and 71 remain unwound as shown in FIG. 3 as the tight seal of the bulkhead counteracts the force of spring 84 and maintains the bulkhead in its upright position. Trolleys 16 and 38 are located adjacently on track 11, as are trolleys 17 and 39 on track 12.

When it is desired to load or unload the vehicle or to otherwise move bulkhead 10 from its upright position, the bulkhead is pivoted a short distance about the axis of shaft 33 in order to break its seal against the floor and sidewalls. To facilitate this, a handle 89 is secured centrally near the bottom of bulkhead 10 and may be pulled upwardly to break the seal. Immediately after the seal has been broken, spring 84 begins to rotate shaft 55 and the drums 56 and 57 carried thereon. The rotating drums 56 and 57 wind up cables 64 and 71 to thereby pivot bulkhead 10 upwardly, with trolleys 16 and 38 rolling away from one another along track 11 and trolleys 17 and 39 rolling away from one another along track 12. Bulkhead 10 is eventually pivoted by the cables to a fully raised position adjacent to the ceiling, as shown in broken lines in FIG. 2. The force of spring 84 thereafter retains the bulkhead in its raised position for as long as desired. To again move the bulkhead to its upright or vertical position, the bulkhead is simply pivoted downwardly till it tightly seals against the side walls, floor and ceiling, and the tight seal thereafter retains the bulkhead in its upright position against the force of spring 84.

Longitudinal repositioning of the bulkhead within the vehicle is easily accomplished when the bulkhead is in its raised position. Alternatively, the mounting of trolleys 16 and 17 for differential movement permits bulkhead 10 to be moved longitudinally without the necessity of raising it. To accomplish this, the seal of the upright bulkhead against each of the side walls of the vehicle is broken by manipulating the bulkhead appropriately to move one of the trolleys 16 and 17 slightly ahead of the other. Bars 23 and 30 thereby pivot about their respective pivot pins 24 and 32 and also slide within shaft 33 to orient shaft 33 and bulkhead 10 at an angle relative to the vehicle walls. Trolleys 38 and 39 also move differentially to maintain shaft 55 parallel to shaft 33. With the seal of bulkhead 10 against the vehicle walls broken, the bulkhead may be moved longitudinally within the truck body to the desired position. The bulkhead is then manipulated until it is again square with the vehicle walls and effects a tight seal therewith.

Turning now to FIGS. 4 and 5, an alternative means for mounting shaft 55 and drums 56 and 57 is illustrated. Bracket 73 and coil spring 84 are eliminated, and a pair of helical springs 90 and 91 are substituted for the coil spring. Bar 45 is inserted in one end of the hollow shaft 55 and pinned thereto at 92 such that shaft 55 itself does not rotate. Bar 53 is slidably received in the opposite end of shaft 55 in the manner previously related. In this alternative embodiment, drums 56 and 57 are mounted for free rotation on shaft 55 near the opposite ends thereof.

Referring particularly to FIG. 5, the outer end of spring 91 is connected to a horizontal pin 93 that extends outwardly from drum 57 at a location offset from the rotational axis of the drum. The inner end of spring 91 is fixed to a pin 94 which is anchored to shaft 55. Accordingly, spring 91 exerts a continuous rotational force on drum 57 in the direction indicated by the arrow in FIG. 5. Spring 90 is similarly connected to drum 56. The outer end of spring 90 is fixed to a pin 95 that projects horizontally from drum 56, while the inner end of the spring is secured to shaft 55 by a pin (not shown).

When bulkhead 10 is positioned in its upright, sealing position, the force of the seal counteracts the force exerted by the helical springs 90 and 91. However, when bulkhead 10 is moved sufficiently to break the seal against the floor of the vehicle, springs 90 and 91 rotate drums 56 and 57 on shaft 55. Cables 64 and 71 are thereby wound up on the drums and bulkhead 10 is pivoted upwardly to its fully raised position near the ceiling of the vehicle. As previously related in connection with the first embodiment, trolleys 16 and 17 may be moved differentially to reposition bulkhead 10 without requiring it to be raised.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention we claim:
1. Apparatus for partitioning a carrier vehicle having a pair of opposite side walls, a floor, and a ceiling, said apparatus comprising:
   a bulkhead having a size to fit closely within said vehicle in a substantially upright position to effect a seal therein;
   means for mounting said bulkhead in extension substantially between said side walls for pivotal movement about a substantially horizontal pivot axis located in proximity to said ceiling, and for longitudinal movement within the vehicle in a manner to permit said bulkhead to be oriented in said upright position at a variety of locations along the length of the vehicle;
   a winding member;
   means supporting said winding member for rotation within said vehicle and for longitudinal movement therewithin along with said bulkhead;

a flexible cable wound on said winding member and having an end coupled to said bulkhead at a location offset from the pivot axis thereof; and yieldable means exerting a rotative force on said winding member, said yieldable means being operable when said seal is broken to rotate said winding member in a direction to wind up said cable and thereby pivot said bulkhead about its pivot axis from said upriht position to a raised position adjacent said ceiling.

2. Apparatus as set forth in claim 1, wherein said yieldable means includes a spring coupled to said winding member and operable to rotate same upon the breaking of said seal.

3. Apparatus as set forth in claim 2, including means for adjusting said spring to vary the rotative force exerted on said winding member.

4. Apparatus as set forth in claim 1, including a second winding member urged to rotate by said yieldable means and a second flexible cable wound on said second winding member and having an end coupled to said bulkhead offset from the pivot axis thereof, said winding member support means including a generally transverse shaft supported near said ceiling for movement along said side walls longitudinally thereof, said shaft providing rotative support for said winding members.

5. Apparatus as set forth in claim 4, wherein said winding members are supported on said shaft near the respective opposite ends thereof and wherein each one of said cables has its end coupled to said bulkhead below the center thereof to facilitate the pivotal movement of said bulkhead.

6. Apparatus as set forth in claim 4, wherein said winding members are rigidly carried on said shaft and said yieldable means includes a spring coiled around said shaft in a manner to exert a rotative force thereon, whereby said spring rotates said shaft and the winding members carried thereon upon the breaking of said seal.

7. Apparatus as set forth in claim 4, wherein said winding members are rotatable relative to said shaft and said yieldable means includes a pair of springs coupled to the respective winding members in a manner to exert a rotative force thereon, whereby said springs rotate said winding members upon the breaking of said seal.

8. Movable bulkhead apparatus for partitioning a carrier vehicle having a pair of opposite side walls, a floor, and a ceiling, said apparatus commprising:

a rigid bulkhead having a size to fit closely within said vehicle in a substantially upright position to effect a seal therein;

a pair of tracks adapted for mounting along the opposite side walls of said vehicle in proximity to the ceiling thereof;

a pair of trolleys riding on the respective tracks, each trolley having a body; bracket means secured to said bulkhead for receiving a first shaft; said first shaft extending between said trolleys and supporting said bulkhead for pivotal movement and having tubular opposite ends;

a pair of generally cylindrical bars received in the respective tubular ends of said first shaft, said bars being slidably movable in said tubular ends;

means presenting a generally horizontal slot in the body of each trolley, said bars being received in the respective slots in a manner to pivot from side to side therein;

pin means pivotally coupling said bars with the respective trolley bodies for pivotal movement about generally vertical axes, thereby permitting said trolleys to move differentially on said tracks;

a pair of roller assemblies riding on the respective tracks;

a second shaft extending between said roller assmblies; and drum and cable means supported on said second shaft and coupled to said bulkhead at a location offset from said first shaft, spring means exerting a rotative force an said drum means in a direction to wind up said cable means, said drum and cable means being operable when said seal is broken to pivot said bulkhead about said first shaft from said upright position to a raised position adjacent said ceiling.

* * * * *